(12) United States Patent
Lenzner

(10) Patent No.: US 10,789,413 B2
(45) Date of Patent: Sep. 29, 2020

(54) WEB PAGE DESIGNING WITH TIMELINES

(71) Applicant: salesforce.com, inc., San Francisco, CA (US)

(72) Inventor: Marcus Lenzner, Jena (DE)

(73) Assignee: salesforce.com, inc., San Francisco, CA (US)

( * ) Notice: Subject to any disclaimer, the term of this patent is extended or adjusted under 35 U.S.C. 154(b) by 40 days.

(21) Appl. No.: 16/290,212

(22) Filed: Mar. 1, 2019

(65) Prior Publication Data

US 2020/0279014 A1    Sep. 3, 2020

(51) Int. Cl.
| | |
|---|---|
| H04N 21/262 | (2011.01) |
| H04N 21/43 | (2011.01) |
| G06F 17/50 | (2006.01) |
| G06Q 30/02 | (2012.01) |
| G06F 40/106 | (2020.01) |
| G06F 3/0484 | (2013.01) |
| H04L 29/08 | (2006.01) |
| G06Q 30/06 | (2012.01) |
| G06F 16/48 | (2019.01) |
| G06Q 10/10 | (2012.01) |

(52) U.S. Cl.
CPC ........ *G06F 40/106* (2020.01); *G06F 3/04847* (2013.01); *G06F 16/489* (2019.01); *G06Q 10/101* (2013.01); *G06Q 10/109* (2013.01); *G06Q 30/02* (2013.01); *G06Q 30/0272* (2013.01); *G06Q 30/06* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 5,786,814 | A * | 7/1998 | Moran | G11B 27/034 715/720 |
| 6,016,478 | A * | 1/2000 | Zhang | G06Q 10/06314 705/7.19 |
| 8,005,855 | B2 * | 8/2011 | Kikin-Gil | G06F 16/957 707/769 |
| 8,301,636 | B2 * | 10/2012 | Stillion | G06Q 10/109 707/748 |
| 8,533,598 | B2 * | 9/2013 | Meaney | G11B 27/031 715/716 |
| 8,566,348 | B2 * | 10/2013 | Rinearson | G06Q 30/02 707/769 |
| 8,799,005 | B2 * | 8/2014 | Pantaliano | G06Q 30/02 705/1.1 |
| 9,032,299 | B2 * | 5/2015 | Lyons | G06F 3/0481 715/720 |
| 9,152,734 | B2 * | 10/2015 | Rinearson | G06Q 30/02 |

(Continued)

*Primary Examiner* — Jordany Nunez
(74) *Attorney, Agent, or Firm* — Compass IP Law, PC

(57) ABSTRACT

Designing and previewing web pages include accepting user input to select a customer segment and a first point in time in a time frame of a time line; displaying a representation of components of a web page visible over the time frame according to visibility rules, the selected customer segment, and the first point in time; accepting user input to select a second point in time in the time frame; and displaying the representation of components of the web page visible over the time frame according to the visibility rules, the selected customer segment, and the second point in time.

25 Claims, 14 Drawing Sheets

(56) References Cited

U.S. PATENT DOCUMENTS

| | | | | |
|---|---|---|---|---|
| 9,286,935 | B1* | 3/2016 | Wilder | G06F 40/211 |
| 9,477,744 | B2* | 10/2016 | Barthel | G06F 16/435 |
| 9,569,791 | B2* | 2/2017 | Akselrod | G06F 16/958 |
| 9,569,792 | B2* | 2/2017 | Akselrod | G06F 16/9577 |
| 9,588,970 | B2* | 3/2017 | Rinearson | G06Q 10/101 |
| 10,108,731 | B2* | 10/2018 | O'Connell, Jr. | G06F 16/958 |
| 10,636,014 | B2* | 4/2020 | Cannons | G06Q 10/1095 |
| 2004/0027368 | A1* | 2/2004 | Snyder | H04N 5/268 |
| | | | | 715/716 |
| 2004/0039626 | A1* | 2/2004 | Voorhees | G06Q 10/02 |
| | | | | 705/7.19 |
| 2005/0021403 | A1* | 1/2005 | Ozer | G06Q 30/0241 |
| | | | | 705/14.52 |
| 2005/0222971 | A1* | 10/2005 | Cary | G06Q 10/109 |
| 2007/0005580 | A1* | 1/2007 | Rinearson | G06Q 30/02 |
| 2007/0143684 | A1* | 6/2007 | Stillion | G06Q 10/109 |
| | | | | 715/733 |
| 2007/0143685 | A1* | 6/2007 | Stillion | G06F 3/04886 |
| | | | | 715/733 |
| 2008/0010518 | A1* | 1/2008 | Jiang | H04N 5/782 |
| | | | | 714/21 |
| 2008/0091497 | A1* | 4/2008 | Julien | H04N 21/23116 |
| | | | | 705/7.12 |
| 2008/0160956 | A1* | 7/2008 | Jackson | H04M 3/493 |
| | | | | 455/406 |
| 2009/0199113 | A1* | 8/2009 | McWhinnie | G06Q 10/06 |
| | | | | 715/762 |
| 2009/0263101 | A1* | 10/2009 | Rudolph | H04N 5/782 |
| | | | | 386/292 |
| 2010/0281381 | A1* | 11/2010 | Meaney | G11B 27/34 |
| | | | | 715/723 |
| 2010/0281382 | A1* | 11/2010 | Meaney | G11B 27/34 |
| | | | | 715/723 |
| 2010/0281383 | A1* | 11/2010 | Meaney | G11B 27/031 |
| | | | | 715/723 |
| 2013/0173531 | A1* | 7/2013 | Rinearson | G06F 16/93 |
| | | | | 707/608 |
| 2013/0219291 | A1* | 8/2013 | Stillion | G06F 3/0484 |
| | | | | 715/748 |
| 2014/0258894 | A1* | 9/2014 | Brown | G06F 8/71 |
| | | | | 715/762 |
| 2014/0258968 | A1* | 9/2014 | Brown | G06F 40/166 |
| | | | | 717/103 |
| 2014/0258969 | A1* | 9/2014 | Brown | G06F 8/30 |
| | | | | 717/103 |
| 2014/0258970 | A1* | 9/2014 | Brown | G06F 8/47 |
| | | | | 717/103 |
| 2014/0343990 | A1* | 11/2014 | Photowat | G06Q 30/0252 |
| | | | | 705/7.17 |
| 2015/0026573 | A1* | 1/2015 | Meng | G06F 8/61 |
| | | | | 715/716 |
| 2015/0227518 | A1* | 8/2015 | Kallan | G06F 16/2358 |
| | | | | 707/725 |
| 2015/0245100 | A1* | 8/2015 | Stallings | H04N 21/26241 |
| | | | | 725/58 |
| 2015/0317399 | A1* | 11/2015 | Akselrod | G06F 16/9535 |
| | | | | 707/723 |
| 2015/0356600 | A1* | 12/2015 | Akselrod | H04L 67/02 |
| | | | | 705/14.5 |
| 2017/0262865 | A1* | 9/2017 | Littlejohn | H04N 21/44 |
| 2017/0337195 | A1* | 11/2017 | Rinearson | G06F 16/93 |
| 2018/0095938 | A1* | 4/2018 | Monte | G06F 3/0484 |
| 2018/0108052 | A1* | 4/2018 | Meyer | G06Q 30/0241 |

* cited by examiner

FIG. 8    800

WEB PAGE DESIGNING WITH TIMELINES

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2019, salesforce.com, Inc. All Rights Reserved.

TECHNICAL FIELD

One or more implementations relate to the field of world wide web (WWW) pages, and more specifically, to web page creation and previewing.

BACKGROUND

Online merchants can assemble content that is going to be rendered as part of a web page visible to a customer on a web site (e.g., a business to consumer (B2C) storefront online shopping page). This assembly process typically consists of combining multiple web page components in order to present a frequently changing visual experience to shopper. For example, the merchant may have a new advertising campaign to be scheduled for the upcoming holiday season and wants to build a landing page for this purpose. This landing page will likely contain may web page components, for example, multiple product tiles to promote products, a carousel of top selling products, a blog article describing product features and capabilities, and perhaps even content directed to certain demographic groups, and so on. Further, some components may be added and some components may be deleted from the web page based on time and/or customer segments. One challenge is how to design and preview these web pages prior to publication given the complexity of the changes.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

Figure 1:
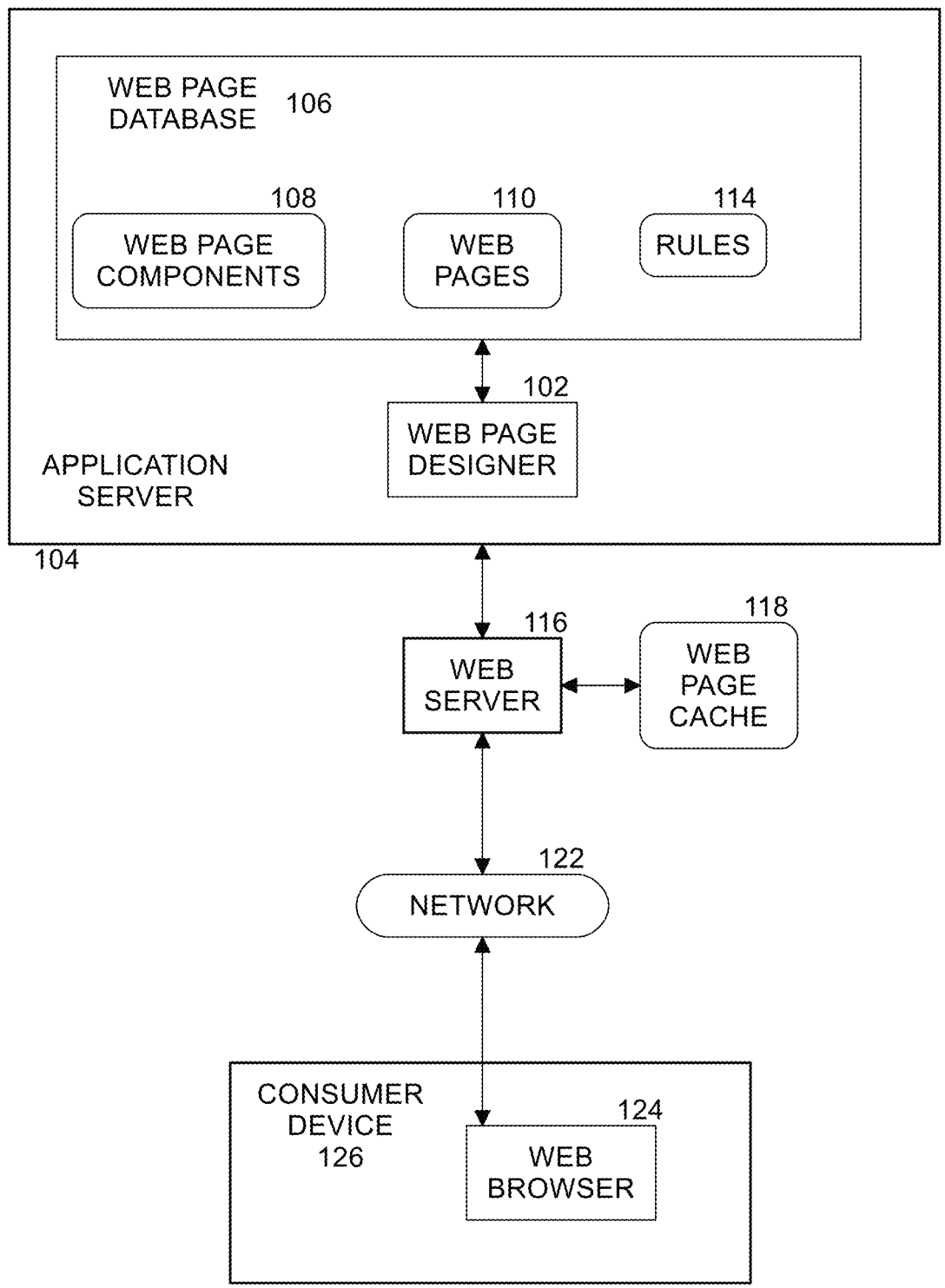
FIG. 1 is a diagram of an example arrangement of web page processing according to an embodiment.

The following description describes a method and apparatus for designing web pages in an efficient and scalable manner. In embodiments, a web page designer application is provided that includes a timeline feature to allow the web page designer to select customer segments and/or a date and time parameters to preview how the web page will look in the future given the selected parameters. This feature is advantageous for situations where the web page changes frequently depending on the customer segment, dates and times, or other parameters.

Proprietors of e-commerce web sites assemble web page content that is going to be rendered as part of a web page visible to customers. This assembly process typically consists of creating and/or selecting multiple components (e.g., text, images, videos, logos, product information, advertisements, reviews, etc.) in order to present a visual experience to the online shopper. In many cases, the web pages are changed frequently in order to keep the content fresh and engaging for the customer. In other situations, the web pages are updated to reflect changing business conditions, advertising campaigns, promotions, and seasons. For example, the merchant may have a set of web pages for the upcoming holiday season. Each web page contains multiple components. One challenge is that some of those components of the web page may be controlled by one or more rules that control their visibility. For example, one rule may specify that one of the product tiles on the web page should be visible on a specific day during an advertising campaign time frame (e.g., Black Friday, Cyber Monday) and for another rule a certain product tile should only be visible to customers that belong to a selected customer segment (e.g., big spender customers, only men, only students from Texas, customers who have previously purchased certain products, etc.).

In one embodiment, a web page designer application helps merchants with the process of designing web pages and provides the capability to define such visibility rules for the whole web page or even separately for any of the components on the page. The web page designer application provides visual support to the designer during the content authoring process to understand scheduling of components on the web page. For a web page with many components and with one or more of the components having their own scheduling for visibility (e.g., use), the design process can become very complex and hard to understand across all the components on the page changing at different times and for different customer segments. In some cases, the schedules of components may overlap and/or contradict each other, resulting in visual displays to the customer that are not intended. Embodiments overcome such difficulties by providing web page design features to visually represent the components in such as way as to assist the designer in identifying potential problems and correcting the problems before moving the web page to a production web site visible to customers.

In an embodiment, an entire web page and all included components, as placed and configured by the merchant, can automatically be inspected by the web page designer application. The web page designer application then derives scheduling information from metadata associated with the components and generates a timeline that has multiple points in time, each point in time indicating changes to the rendering result of the page at the given points in time, and which of the page's components is causing the change. Furthermore, the timeline can be represented to the web page designer with a time slider control, which enables the web page designer to fast forward or rewind to those point in time indicators. The user interface control (e.g., the time slider) to change the display of the web page based on the time causes the page to be rendered for that point in time. In an embodiment, the timeline, with such clear indicators, illustrates to the web page designer which of the components that are predicted to change at selected points in time and gives visual feedback as to which of the related components on the page is causing the change. In an embodiment, the web page designer shows an extended view of the web page over time similar to a Gantt chart, so that overlapping or contradicting schedules of the various components can easily be identified.

FIG. 1 is a diagram of an example arrangement 100 of web page processing according to an embodiment. Application server 104 is a computer server that resides in a data center, either one managed by the merchant or by a cloud service provider (CSP). In an embodiment, application server 104 executes code to create hyper-text markup language (HTML) output. In an embodiment, application server 104 is not directly accessible by customers over a network such as the Internet. There may be multiple application servers managed by a CSP. An application server 104 includes a web page designer application 102. Web page designer application 102 is an application program used by the merchant (or by a web site developer contracted to design the web site for the merchant) to design web pages 110 for an on-line storefront (e.g., a merchant web site for selling goods (e.g., products) to customers). The merchant assembles one or more web pages 110 during the design process from multiple web page components 108 using web page designer 102. Web pages 110 include code and/or data that define the web site's format, function and visual appearance. A web page is an assembly of components that can be rendered on the web site. Web pages may be of different page types. A page type includes a definition of a layout and code to produce HTML descriptions of the layout.

In an embodiment, the merchant's web site is run on a cloud computing platform provided by the CSP. Application server 104 includes a web page database 106, which may be integral with the application server or accessible by application server 104 within a cloud computing platform. Web page database 106 includes web pages 110 and web page components 108. Web page components 108 include content items that can be created, selected, and/or configured by the merchant, such as text, images, videos, logos, product codes, product images, banners, advertisements, and so on. Components may include other components in a nested manner. A component may be categorized according to a component type. A component type is a definition of configuration options, and code that produces a markup of a component. The component type may define sub-layouts for nested components.

Web page database 106 includes one or more visibility rules 114. In an embodiment, visibility rules 114 include visibility conditions for one or more components in web page components 108 and web pages 110. Visibility rules 114 are used by web page designer 102 to determine when and under what conditions web page components 108 are to be included and/or visible in web pages 110 to a specific customer at a specific time. Conditions can be based on one or more of any characteristics, customer attributes, demographic information, time, geographic location, Internet Protocol (IP) address, interests, or any other data. In an embodiment, visibility is based on a schedule (e.g., only visible during the holiday season). In an embodiment, visibility is based on defined customer segments (e.g., only visible for male customers from Wyoming). In an embodiment, the customer segments are defined statically by the merchant, dynamically based on changing conditions, or based on rules themselves. For example, rules for customer segments can define customers from certain countries based on geolocation or an address, customers of a certain gender, customers who spent a certain amount of money with the merchant (which could be limited by time), customers who normally order a certain amount of products at one time, customers who visited the web site a certain number of times in a selected time period, customers who clicked on a particular advertisement, customers whose birthday is today, this week, or this month, customers who put a certain number of products in their online shopping basket but never bought them, or customers who make many product returns, and so on. Any rules defining customer segments or otherwise describing customers may be used.

Application server 104 communicates with web server 116. Web server 116 is a computer server that performs caching of web pages, delivery of web pages, load balancing, and secure socket layer (SSL) termination operations. In some embodiments, a plurality of application servers 104 can be coupled with web server 116, and a plurality of web servers 116 can be coupled with an application server. In an embodiment, web server 116 is operated by a CSP. Web server 116 is coupled to network 122 (such as the Internet, for example) for sending web pages to a customer's consumer device 126 as is well known in the art. Consumer device 126 is a computing device such as a personal computer (PC), smart phone, tablet computer, laptop computer, personal digital assistant (PDA), electronic book reader, smart television display, shopping kiosk, or other computing device for running web browser 124 to display web pages 110.

Web server 116 is coupled with web page cache 118. In an embodiment, web page cache 118 is a database in a cloud computing platform provided by the CSP or by the merchant. Web page cache 118 stores web pages for efficient delivery to consumer devices 126. In an embodiment, application server 104 may be combined with web server 116, and web page database 106 and web page cache 118 may be combined into one database.

In an embodiment, web page designer application 102 includes at least two operating modes. A first mode is called an edit mode, wherein a designer selects components to be a part of the web page and web page designer application 102 renders the edited page augmented with visual controls for editing the page (e.g., user interface (UI) controls for changing component properties, for moving components around on the page, etc.). A second mode is called a preview mode, wherein web page designer application renders the edited page with augmentation so the visual result of the changes is as close as possible (in the design and/or test environment) to what the customer will experience when viewing the page in the production environment (e.g., a live online storefront accessible to the public).

When a designer wants to preview the rendering of previously created page, the designer uses web page designer application 102 to configure the preview context. In an embodiment, the preview context includes a selected point in time (including date) and one or more customer segments. Web page designer application 102 applies the preview context, thus causing the visual display of the online storefront represented by the page 110 to refresh its rendering based on the current preview context, effectively simulating as if it were the selected point in time and as if the currently browsing customer is a member of the selected customer segments. (e.g., a previewing a female customer with gold shopping status on Black Friday, for example). This results in the applicable visibility rules 114 being applied as specified. In an embodiment, the preview context and associated visibility rules are applied for both edit mode and preview mode of operation resulting in a consistent prediction of what the page 110 will look like (e.g., visually representing which components 108 are shown or hidden given the preview context).

A page (acting as a root element of a tree) is comprised on multiple components (acting as nodes within the tree). The hierarchical structure results from merchant interaction with web page designer 102. A sample page with header, footer, an article and a promotional product carousel could look as follows from a structural point of view.

Figure 2:
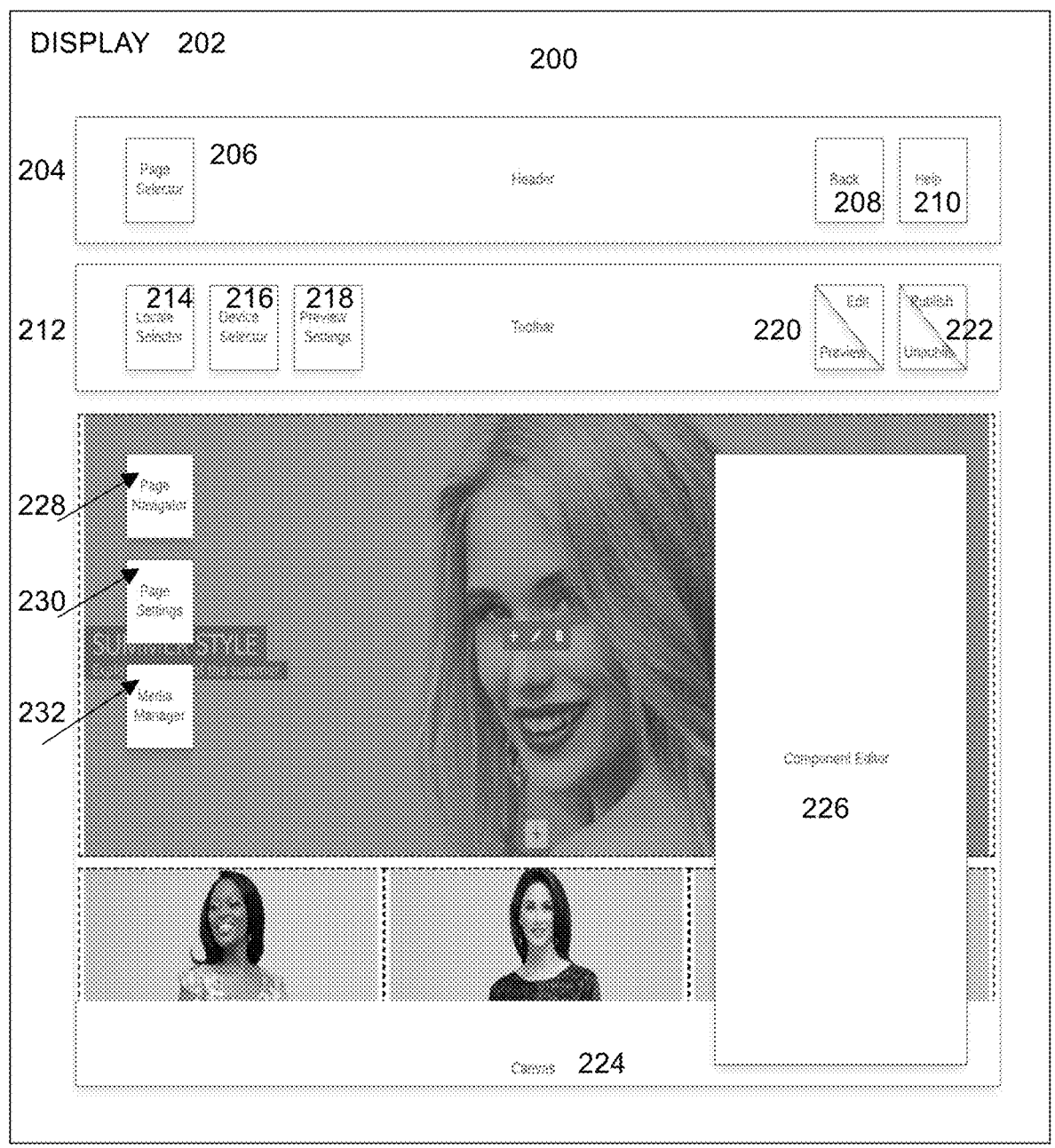
FIG. 2 illustrates an example of a user interface (UI) of a web page designer application according to an embodiment.

Advertising campaign landing page
Header component
Article component
Product carousel component
    Product tile component
    Product tile component
    Product tile component
Footer component FIG. 2 illustrates an example of user interface (UI) 200 of a web page designer application 102 rendered on a display 202 of a computing device according to an embodiment. During edit mode (e.g., page design time), UI 202 includes page header 204, which includes page selector button 206 for selecting a page to edit, back button 208 to exit from the web page designer application and help button 210 to select the display of documentation. UI 202 includes toolbar 212 for user controls. Toolbar 212 includes locale selector 214 for selecting the locale (e.g., language, country) for editing, device selector 216 for selecting a predefined device (e.g., desktop, mobile, tablet, etc.), preview settings 218 for configuring a preview context including customer segments and preview dates, edit/preview toggle 220 for toggling between edit mode and preview mode, and publish/unpublish toggle 222 for enabling/disabling the page for rendering in the live online storefront. When edit mode is selected, web page designer 102 augments the page rendering with UI controls to allow operations on the components that are part of the page. When in edit mode, web page designer does not allow the designer to browse/click within the page, but only allows the designer to use the UI controls described above. When in preview mode, web page designer renders the page without augmentation, and allows the designer to browse/click within the page to check behavioral effects within the page of selections.

When in edit mode, canvas 224 renders the page with components. The various settings that affect page/component rendering (e.g., locale, preview device, preview context) are applied. Visibility rules 114 as configured for the page and its components are also applied. Canvas 224 allows components of the page to be configured using component editor 226. Page navigator 228 visualizes the hierarchy of components that reside in the page in the shape of a tree view. Page settings 230 allows for changing various properties of the pages (e.g., page visibility rules). Media manager 232 allows for managing static assets (e.g., image upload).

Figure 3:
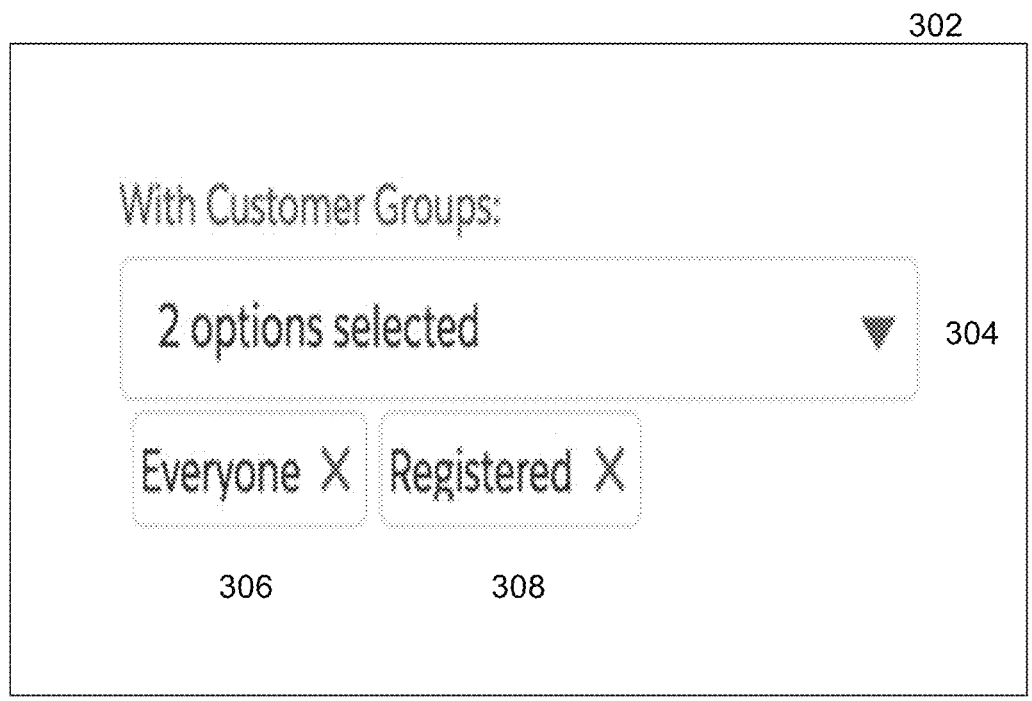
FIG. 3 illustrates an example of a user interface for selecting customer segments according to an embodiment.

FIG. 3 illustrates an example of a user interface (UI) 302 for selecting customer segments on display 202 according to an embodiment. Web page designer application 302 provides UI 302 displayed to the designer so the designer can select which customer segments (also known as customer groups) are to be included in a requested web page display. For example, a drop down box 304 maybe included to show to the designer a list of the various possible selections for customer segments. The list of customer segment selections is shown as visual elements for which each of them can be unchecked to reverse the selection. Other UI techniques can also be used to get the customer segment inputs (e.g., free form text entry, selection via buttons, etc.). In this example, the designer has selected the "everyone" customer segment 306 and the "registered" customer segment 308. These parameters will then be applied by web page designer application 102 to the web page components and visibility rules 114 to determine which components are to be included in the visual page representation. In another embodiment, the customer segments may be selected in other parts of the web page designer application or input by a script, for example.

Figure 4:
FIG. 4 illustrates an example of a user interface for selecting a date and time for web page components according to an embodiment.

FIG. 4 illustrates an example of a user interface 400 for selecting a date and time on a display for web page components according to an embodiment. Web page designer application 102 includes a capability 402 for the designer to select a point in time by typing in the date and time, or by selecting a data and time via a calendar picker 404 (e.g., the designer can select a year by a drop down menu, select a month, day, hour, minute, and toggle am and pm). Alternatively, the designer could select "today" resulting in no simulation of a different point in time but use of the current system time and date.

However, a calendar date picker cannot provide a visual indication of when changes are going to occur in the web page. Different page rendering results are shown over time because of different visibility rules being applied. In order to overcome the lack of visual indication for guided decision making by the page designer, in embodiments a new visual control for picking a point is used. Processing underlying this visual control includes inspecting the data structures (e.g., the web page component hierarchy) to determine all the time frames that result in a change in page rendering. Processing also includes the ability to identify problematic time frames, thereby allowing the web page designer application to guide editing decisions, not only page previews.

Figure 5:
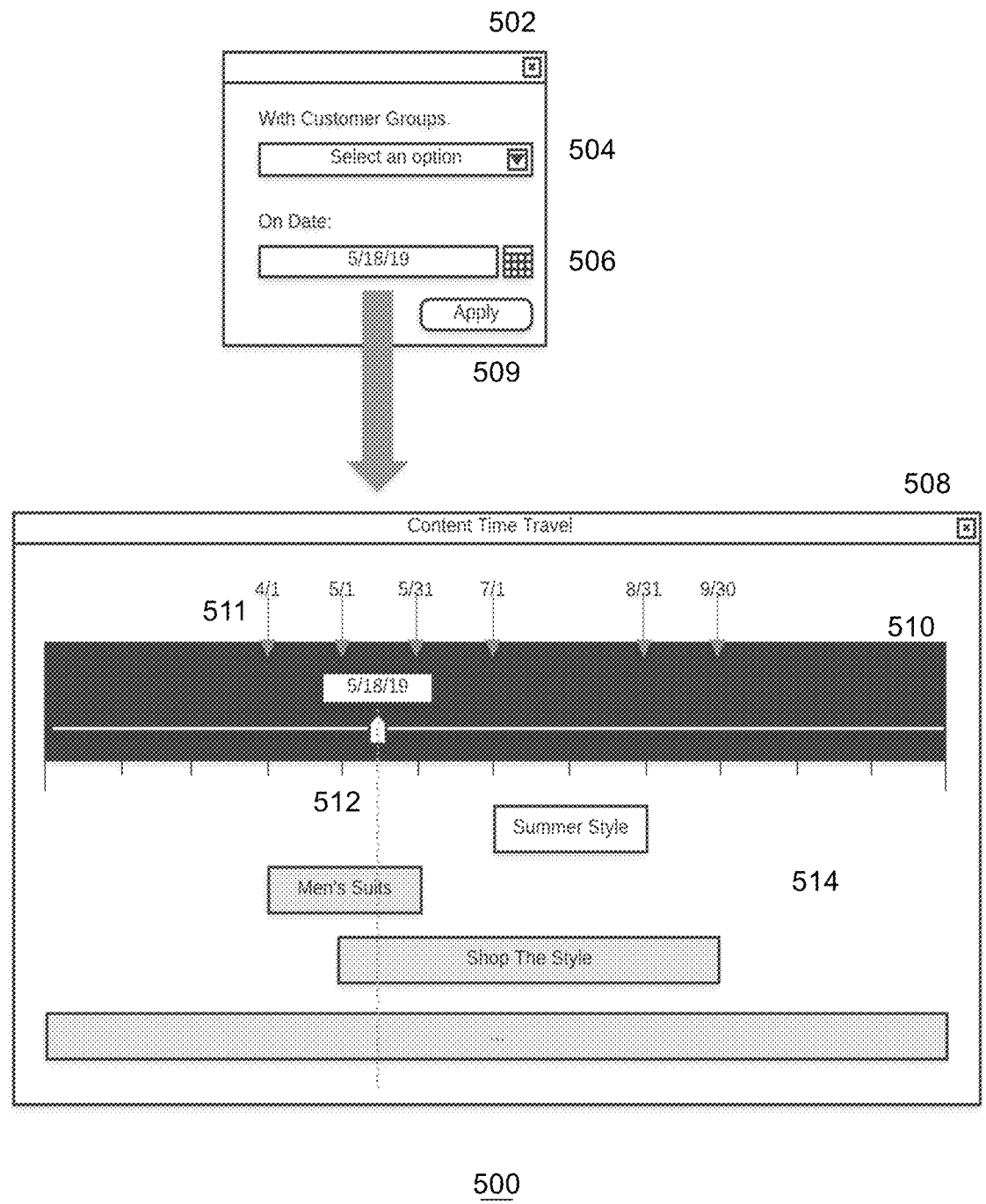
FIG. 5 illustrates an example of a user interface including a timeline of visible web page components according to an embodiment.

FIG. 5 illustrates an example of a user interface 500 including a timeline of visible web page components according to an embodiment. A combined control 502 is displayed by web page designer application 102 on display 202 to the designer allowing the designer to select one or more customer groups via a drop down menu 504 and a date and time via a date selector 506. Combined control 502 include a button 509 to indicate acceptance of the selections. The input parameters of the customer segment and the data and time make up the preview context. Web page designer application 102 uses the preview context, web page 110, visibility rules 114, and web page components 108 to prepare and display a window 508 showing a time line 510. The designer can use a time slider 512 to set and/or adjust the current date and/or time for which a visual representation (e.g., a schedule chart 514) of the web page components is displayed below the time line. The time slider can be moved forward in time or backward in time. Change event indicators 511 (e.g., the arrows pointing down from a date) show when a web page component's visible display begins and ends.

In this example, on the selected date of May 18, 2019, the web page is planned to show a "summer style" component, a "men's suits" component, a "shop the style", and other components. Each component has a date range in which the component is to be displayed on the page. For example, the "men's suits" component is to be displayed from April 1 through May 31. On the selected date of May 18, 2019, the "men's suits" component, the "shop the style" component, and other components are to be displayed, but the "summer style" component is not to be displayed until Jul. 1, 2019. When seeing window 508, the designer can easily determine when selected components are to be displayed (or not) on the web page for the selected customer segments. If the designer has knowledge of the placement on the page of the various components, the designer can easily detect visual conflicts between the components.

When the designer moves the time slider 512, the web page designer application 102 regenerates the contents of canvas window 224 based at least in part on the new time selection, the customer segments, web page components 108, visibility rules 114, and web page 110.

Features of the new visual control in embodiments include providing a mechanism for the designer to seamlessly select a point in time and provide a visual indication of the rendering of the page for that point in time (including a point in time marker 511, a time slider 512, and chart components 514), indicate which components apply for the selected point in time, and detect problematic situations that require the designer's attention.

Figure 6:
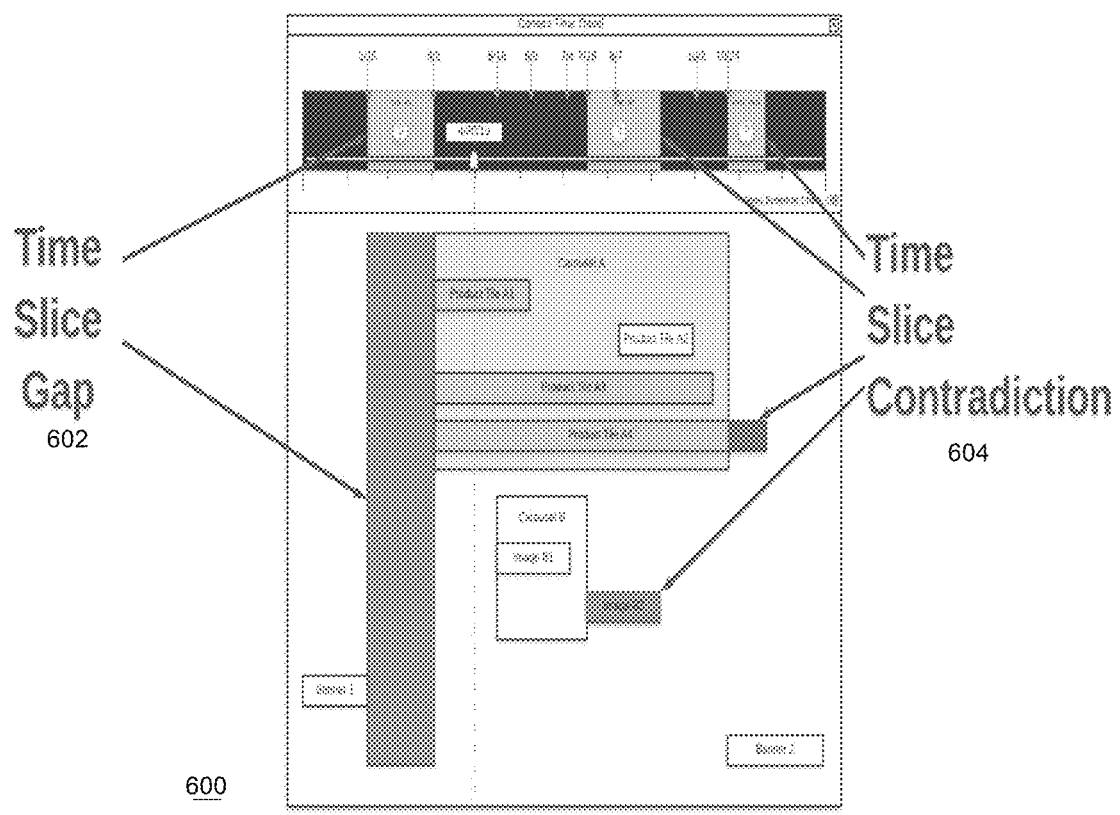
FIG. 6 illustrates an example of a user interface including problematic situations of visible web page components according to an embodiment.

FIG. 6 illustrates an example of a user interface 600 including a problematic situations of visible web page components according to an embodiment. Analysis of time frames, customer segments, and web page components can uncover potential problematic situations with the page design. In one situation, time slice gaps 602 are periods of time for which no content is provided for a location on the web page. For example, the designer might identify that some of the page's visible components are no longer valid during a one-hour time period right after a major holiday because the designer did not properly check that components are still visible despite various promotions and advertising campaigns having ended. In another situation, time slice contradictions 604 include periods of time where components conflict, collide, or overwrite each other. For example, assume a carousel component on a web page includes three sub-components (e.g., product tiles promoting certain products). One of the sub-components might be scheduled in such a way that its own visibility lasts longer than the visibility of the carousel component. In another situation, time slice contradictions 604 include periods of time for which a component is never going to be visible. For example, assume the designer places two sub-components within a carousel component (e.g., wherein the sub-components are category tiles promoting respective new categories of products). One of the sub-components might be scheduled in such a way that its own visibility is entirely outside of the carousel component.

Figure 7:
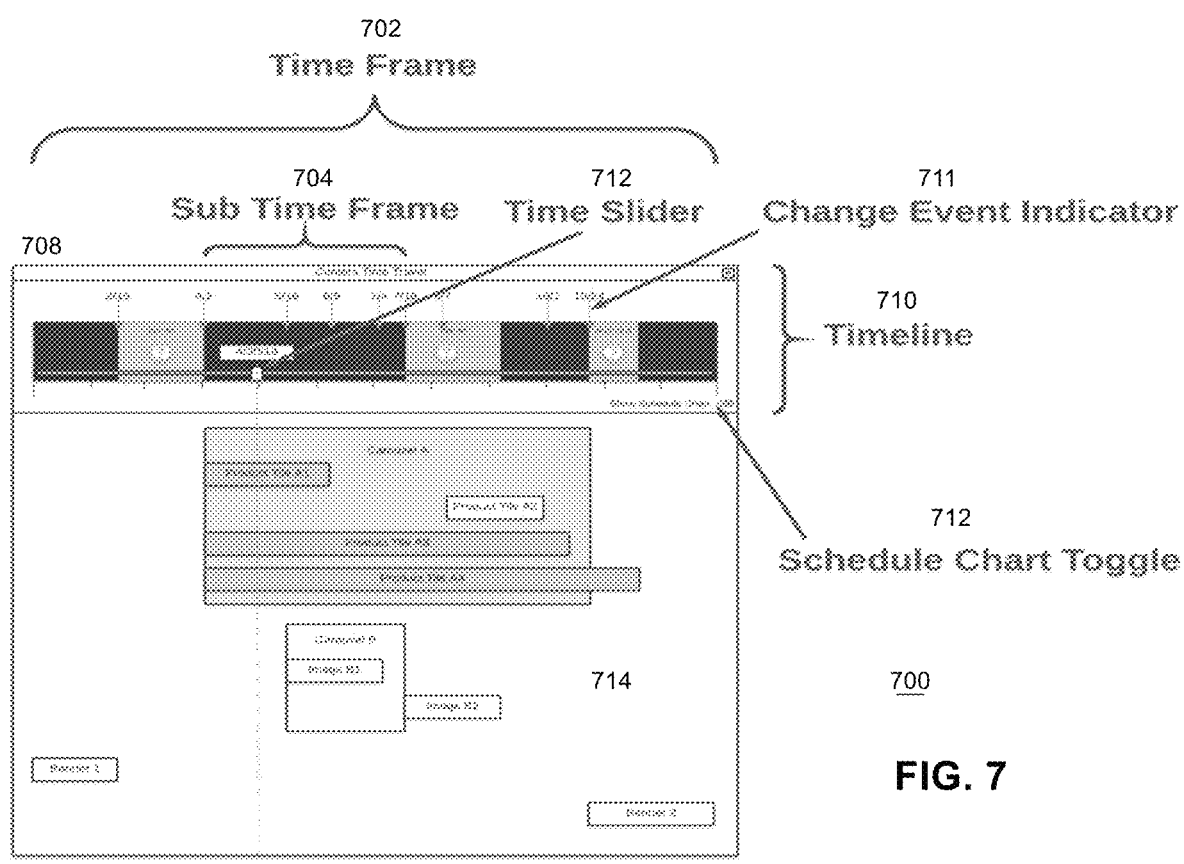
FIG. 7 illustrates an example of a user interface including a timeline of visible web page components and user controls according to an embodiment.

FIG. 7 illustrates an example of a user interface 708 including a timeline 710 of visible web page components and user controls according to an embodiment. A bar 710 represents a time frame 702, from an earliest schedule "from" date across the page and all of the page's components to a latest schedule "to" date across the page and all of the page's components. A change event indicator 711 per point in time indicates when the page or any of the page's components schedule starts or ends. In an embodiment, a change event indicator is visually highlighted on top of the time line 710 (e.g., as an arrow pointing to the corresponding point on the time line). A date and/or time may be shown above the event change indicator. When the designer selects the event change indicator, the preview displayed to the designer is changed. Time frame 702 can be subdivided into a plurality of sub time frames 704 as sliced by change event indicators 711. Sub time frames show starting and ending dates and/or times of sections of a time frame. In an embodiment, problematic sub time frames have their appearance changed to indicate a problem. In an embodiment, the change in appearance is a change in a selected color (e.g., red or yellow) to indicate a potential problem to the designer. In another embodiment, a tooltip (e.g., a question mark icon hovering over the sub time frame) can be used to indicate the potential problem. Time slider 712 allows the designer to slide to any point in time within the visualized overall time frame. Schedule chart toggle 712 allows the designer to hide or show the schedule chart.

Figure 8:
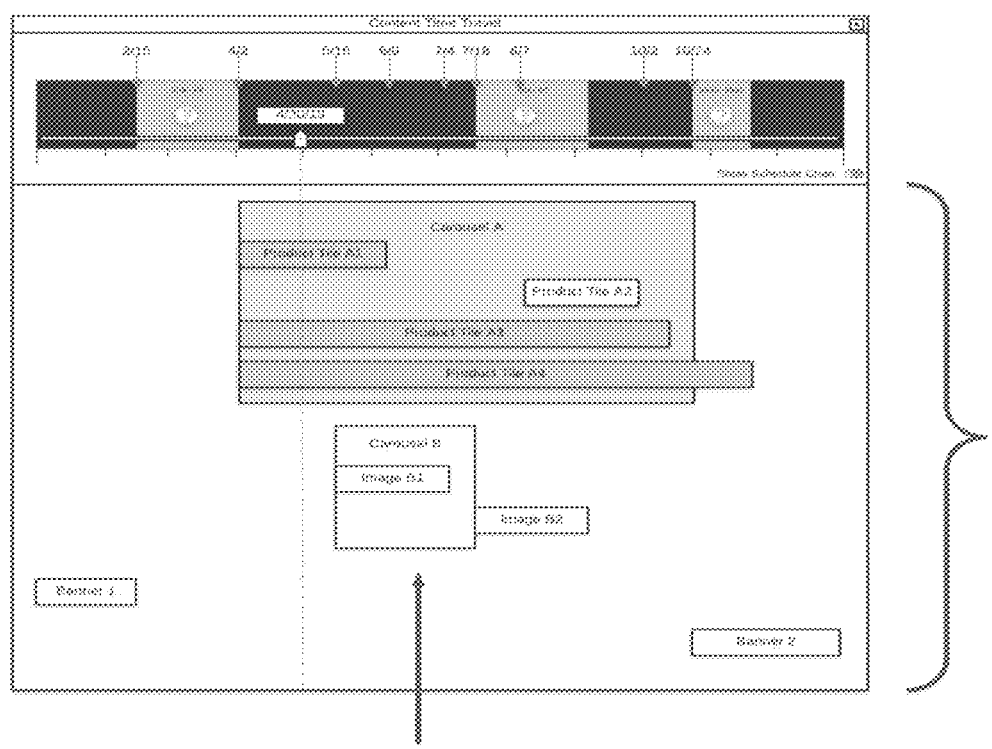
FIG. 8 illustrates an example of a user interface including a schedule bar and schedule chart according to an embodiment.

FIG. 8 illustrates an example of a user interface 800 including a schedule bar 804 and schedule chart 802 according to an embodiment. Schedule chart 802 shows all components of the page. Each component is visualized as a named schedule bar 804. A schedule bar aligns horizontally with a respective start and end change event, and aligns vertically with the parent component the component resides in. In an embodiment, each component is distinguished by different colors indicating if the component is affected by a user input (e.g., whether the component is impacted by a change in the line indicator of the time slider). In an embodiment, a question mark icon is displayed over a problematic sub-frame. When selected, visual highlighting of corresponding schedule bars is performed.

Figure 9:
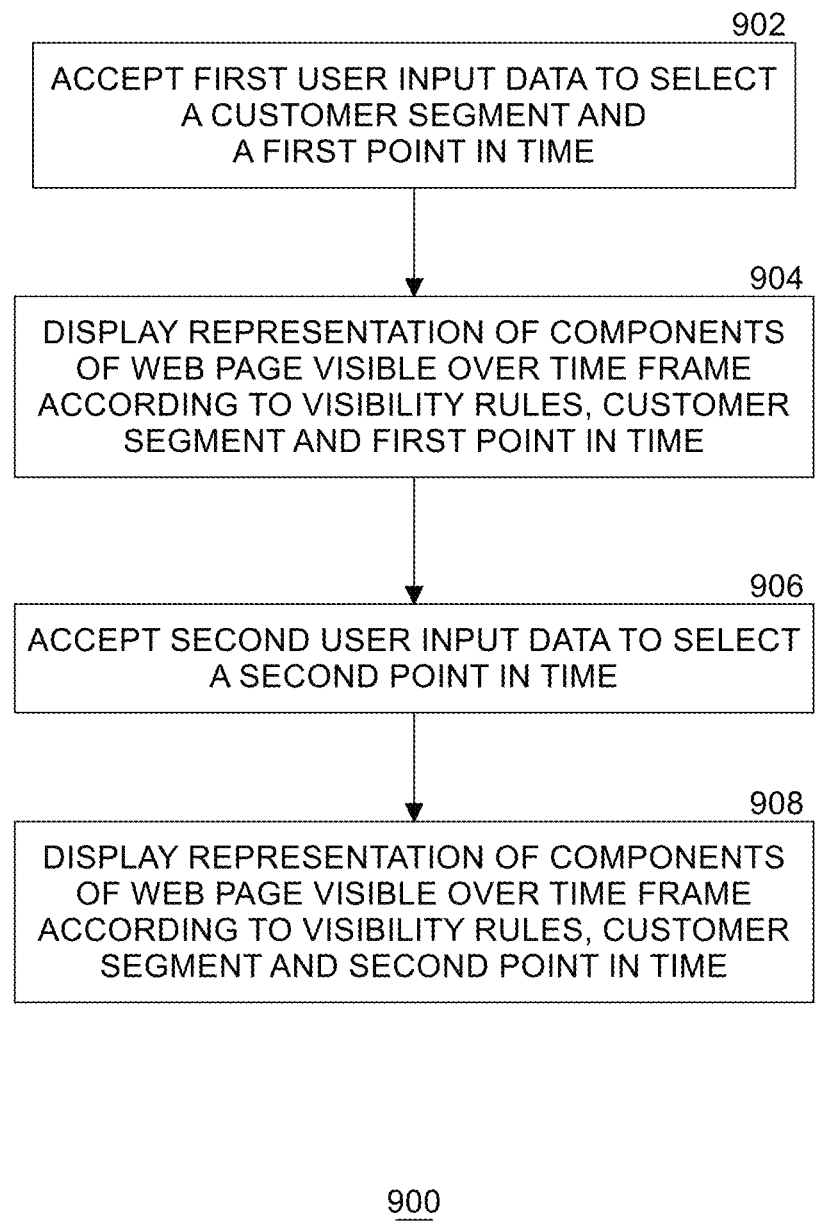
FIG. 9 is a flow diagram of web page processing by the web page designer application according to an embodiment.

FIG. 9 is a flow diagram 900 of web page processing by the web page designer application according to an embodiment. During operation of web page designer 102, the designer (e.g., the user of the design tool) enters user input selections using known methods (mouse clicks, touch screen data entry, touch pad entry, voice input, etc.). In response, web page designer 102 displays and/or re-displays a graphical user interface (GUI) to the designer (as shown above in FIGS. 2-8. The GUI shows a representation of the web page being designed and/or previewed. This allows the designer to observe the GUI and make further changes as necessary.

At block 902, web page designer 102 accepts first user input data to select a customer segment and a first point in time. Selection of the customer segment and date/time are described above with reference to FIG. 3 and FIG. 4. At block 904, web page designer 102 displays a representation of components of the web page that are visible over a time frame 702 according to the visibility rules 114, customer segment, and the first point in time, as shown in FIG. 5. At block 906, web page designer 102 accepts second user input to select a second point in time. In an embodiment, the selection is made by dragging time slider 512. In another embodiment, the selection is made by selecting a change event indicator 711 (change event indicator being associated with at least one point in time). In another embodiment, the selection is made by selecting a schedule bar 804 (schedule bar being associated with at least component and one point in time). Regardless of how the second point in time is selected, at block 908 web page designer 102 updates the display with the new selection by displaying the representation of components of the web page visible over the time frame according to visibility rules 114, customer segment, and the second point in time. Thus, the display of the web page is updated according to designer input.

Figure 10:
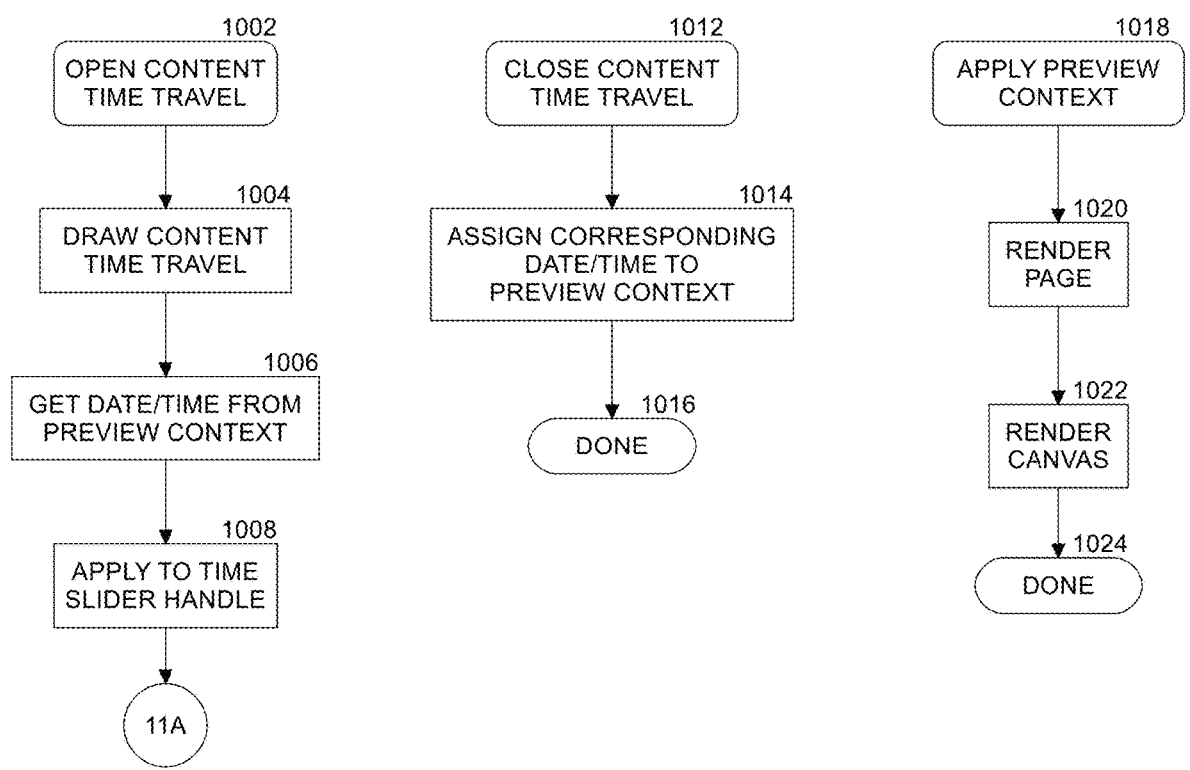
FIG. 10 illustrate flow diagrams of web page display processing by the web page designer application according to an embodiment.

FIG. 10 illustrate flow diagrams of web page display processing by the page designer according to an embodiment. At block 1002, web page designer 102 processes a call to open content time travel (e.g., changing the display of the representation of web page components based on user input for one or more points in time). At block 1004, web page designer draws the initial content time travel display. At block 1008, web page designer gets the date/time from a preview context 1006. At block 1008, web page designer applies the gate/time input to the time slider 712 handle. Processing continues with block 1102 of FIG. 11.

Figure 11:
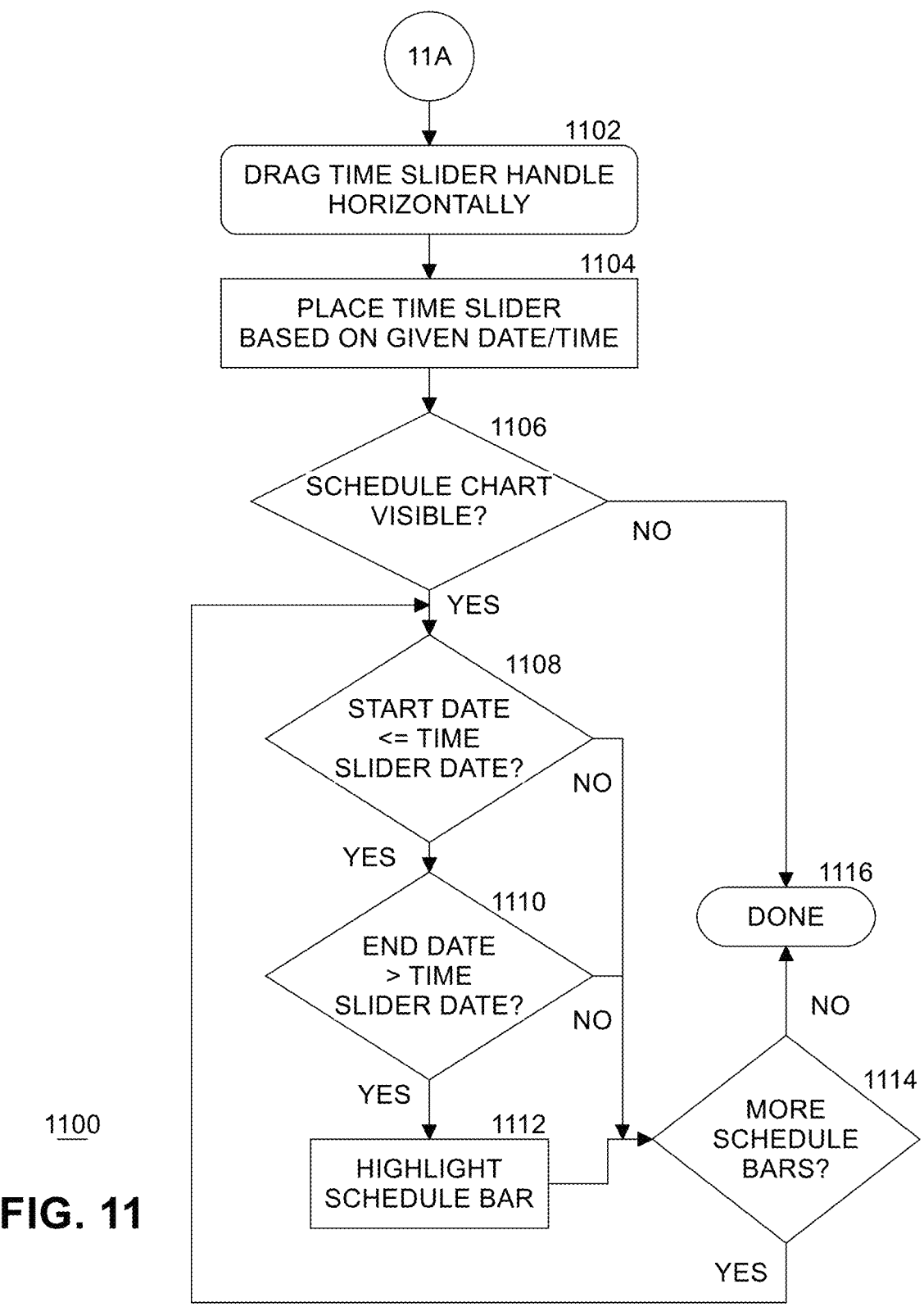
FIG. 11 is a flow diagram of web page display processing by the web page designer application according to an embodiment.

FIG. 11 is a flow diagram 1100 of web page display processing by the page designer according to an embodiment. At block 1102, web page designer drags the time slider handle horizontally based at least in part on the date/time. At block 1104, web page designer places the time slider on the display based at least in part on the given date/time. At block 1106, web page designer checks if schedule chart 802 is visible. If so, at block 1108 web page designer checks if the start date of time frame 702 is less than or equal to the time slider date (e.g., whether the time slider date is in the current time frame). If so, at block 1110 web page designer checks if the end date of time frame 702 is greater than the time slider date (e.g., whether the time slider date is in the current time frame). If so, web page designer highlights schedule bar 804 at block 1112. Processing continues with block 1114, where web page designer determines if more schedule bars need to be processed. If so, processing returns to block 1108. If not, processing is done at block 1116. At either block 1108 or 1110, if the time slider data is not in the current time frame, then processing passes to block 1114. At block 1106, if the schedule chart is not visible, then processing is done at block 1116.

Returning back to FIG. 10, at block 1012, web page designer 102 processes a call to close content time travel. At block 1014, web page designer assigns a corresponding date/time to the preview context. At block 1016, close content time travel is done. At block 1018, web page designer processes a call to apply the preview context. At block 1020, web page designer renders the web page. At block 1022, web page designer renders the canvas 224. Processing is complete at block 1024.

Figure 12:
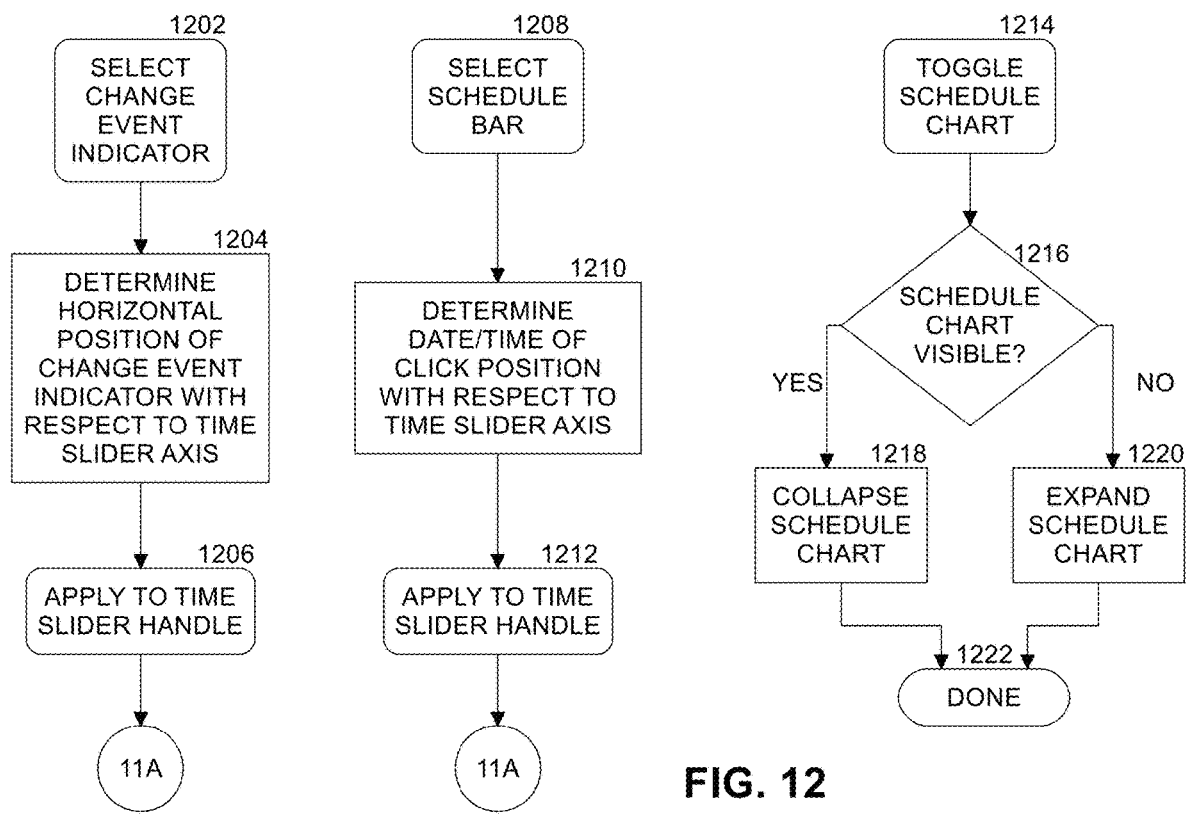
FIG. 12 illustrate flow diagrams of web page display processing by the web page designer application according to an embodiment.

FIG. 12 illustrate flow diagrams of web page display processing by the page designer according to an embodiment. At block 1202, web page designer processes a call to select a change event indicator 711. At block 1204, web page designer determines a horizontal position of change event indicator 711 with respect to the time slider 712 axis. At block 1206, web page designer applies the position of change event indicator to the time slider 712 handle. Processing then passes to block 1102 of FIG. 11. At block 1208, web page designer processes a call to select a schedule bar 804. At block 1210, web page designer determines a date/time of a click position with respect to the time slider 712 axis. At block 1212, web page designer applies the position of the schedule bar to the time slider 712 handle. Processing then passes to block 1102 of FIG. 11. At block 1214, web page designer processes a call to toggle schedule chart 802. At block 1216, web page designer determines if schedule chart 82 is visible. If so, web page designer 102 collapses the schedule chart at block 1812. If not, the schedule chart is expanded at block 1220. In either case, processing ends at block 1222.

An example implementation of draw content time travel of block 1004 is shown below in pseudocode.

---

```
© 2019 saleforce.com, Inc.
Draw Content Time Travel
Create time frame including time slider based on page schedule
start and end dates
Collect set of data from all component start and end dates
For each date loop
   For each sub time frame loop
      Intersect with all component schedules
      If intersection is empty then
         Mark sub time frame as problematic
         Add scenario information to sub time frame time slice gap
      Else
         For each intersection component loop
            Traverse hierarchy upwards and collect all parents
            For each parent loop
               If parent schedule intersects with component schedule then
                  If component schedule not fully inside parent
                  schedule then
                     Add scenario information to sub time frame
                     time slice contradiction conflict
                  End If
               Else
                  Add scenario information to sub time frame time
                  slice contradiction invisible
               End If
               Mark sub time frame as problematic
            End Loop /* each parent */
         End Loop /* each intersection component */
      End If
   End Loop /* each sub time frame */
   For each component loop
      Create schedule bar based on component schedule start and end date
      Horizontally align and size with respect to time slide axis
      Vertically align with respect to region placement
      Vertically size with respect to nesting level
   End loop /* each component */
End Loop /* each date */
Create change event indicator on time frame
Create sub time frame on time frame and size with respect to
time slider axis
```

---

By using a data model of components with possibly nested components, web page designer application 102 can automatically derive time slices that result in a different look of the page to the customer based on a schedule. This allows the designer to preview the web page at selected points in time to optimize the customer experience and result in better marketing effectiveness. In order to show the state transitioning of the web page over time, embodiments not only identify the points in time but also provide the ability to seamlessly and easily fast-forward or rewind the transitions.

In another embodiment, besides presenting schedule related information, customer segment related information can be factored into the analysis. For example, incorrect page displays due to contradicting customer segments may be detected. In a further embodiment, schedule bars may be stretched, contracted, and/or moved in the schedule chart to effect changes in the page. Components may also be added or removed from the page via the schedule bars. In one instance, these changes can be performed as a result of manual interaction by the designer with web page designer application 102. In another instance, these changes can be performed automatically or programmatically based on a set of rules. In another embodiment, the time line and schedule chart can be zoomed in or zoomed out, to change the scale of the time line or schedule chart. This allows the designer to inspect details of the timeline and/or schedule chart.

One or more parts of the above implementations may include software and/or a combination of software and hardware. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), Flash memory, phase change memory, solid state drives (SSDs)) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists the code/data even when the electronic device is turned off (when power is removed), and the electronic device copies that part of the code that is to be executed by the processor(s) of that electronic device from the non-volatile memory into the volatile memory of that electronic device during operation because volatile memory typically has faster read/write times. As another example, an electronic device may include a non-volatile memory (e.g., phase change memory) to store the code/data when the electronic device is turned off, and that same non-volatile memory has sufficiently fast read/write times such that, rather than copying the part of the code to be executed into volatile memory, the code/data may be provided directly to the processor(s) (e.g., loaded into a cache of the processor (s)); in other words, this non-volatile memory operates as both long term storage and main memory, and thus the electronic device may have no or only a small amount of DRAM for main memory. Typical electronic devices also include a set of one or more physical network interface(s) to establish network connections (to transmit and/or receive code and/or data using propagating signals) with other electronic devices.

Figure 13:
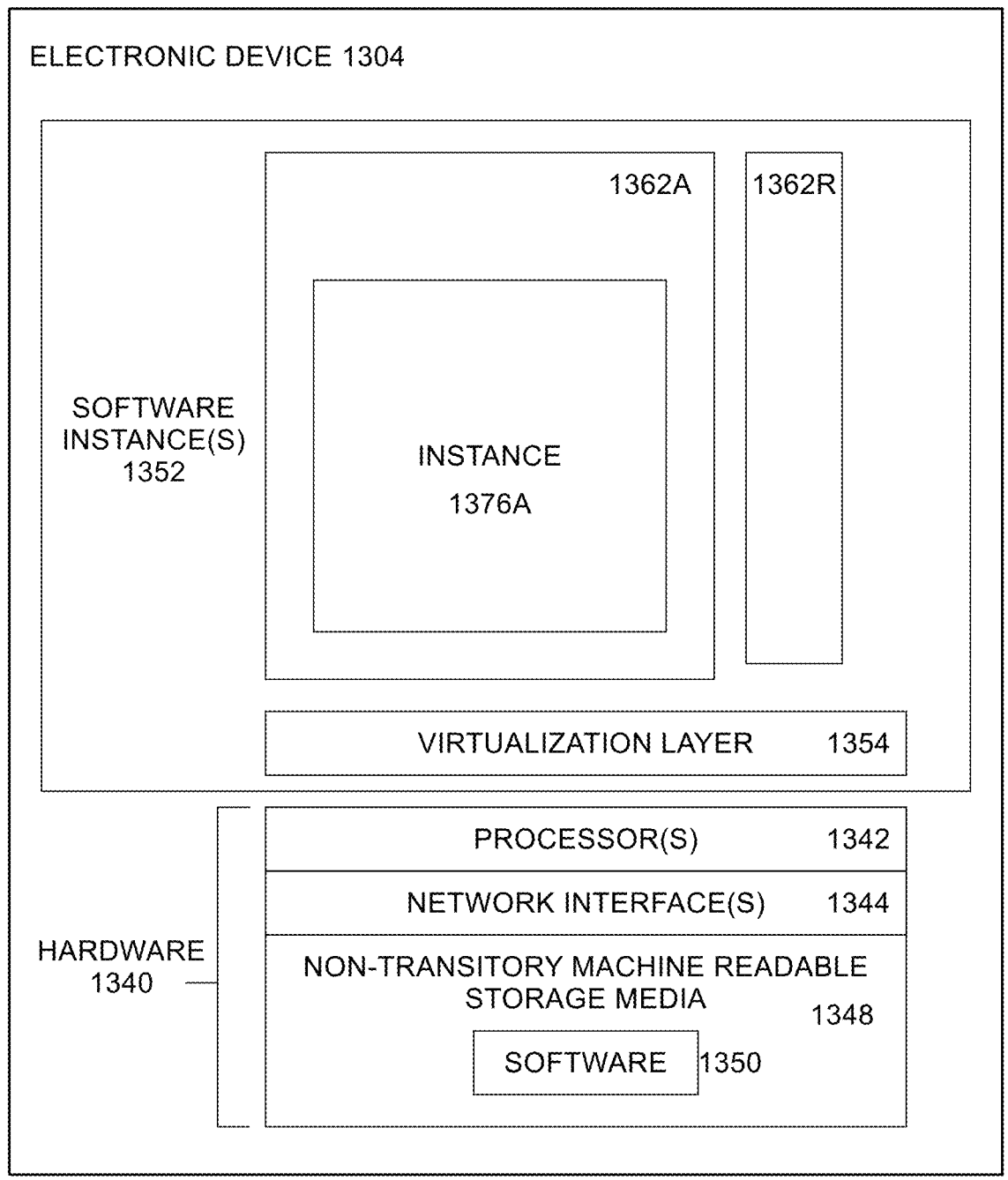
FIG. 13 illustrates an electronic device according to some implementations.

FIG. 13 illustrates an electronic device 1304 according to some implementations. FIG. 13 includes hardware 1340 comprising a set of one or more processor(s) 1342, a set or one or more network interfaces 1344 (wireless and/or wired), and non-transitory machine-readable storage media 148 having stored therein software 1350. Each of the previously described application server 104, web server 116, web page designer application 102, and/or consumer device 126 may be implemented in one or more electronic devices 1304. In one implementation, each of consumer devices is implemented in a separate one of the electronic devices 1304 (e.g., in an end user electronic device operated by an end user; in which case, the software 1350 in each such end user electronic device includes the software to implement one of the end user clients, including software to interface with a cloud computing service (e.g., an application programming interface (API), a web browser, a native client, a portal, a command-line interface, etc.)) and each of application server 104, web page designer 102, and web server 116 is implemented in a separate set of one or more of the electronic devices 1304 (in which case, the software 1350 is the software to implement web page design and delivery of application server 104 (including web page designer 102) and web server 116; in operation, the end user electronic devices and the electronic device(s) implementing the cloud computing system containing application server 104 and web server 116 would be commutatively coupled (e.g., by a network) and would establish between them connections for requesting and providing cloud computing services. In an embodiment, application server 104 and web server 116 may be implemented in the same electronic device. Other configurations of electronic devices may be used in other implementations.

In electronic devices that use compute virtualization, the processor(s) 1342 typically execute software to instantiate a virtualization layer 1354 and software container(s) 1362A-R (e.g., with operating system-level virtualization, the virtualization layer 1354 represents the kernel of an operating system (or a shim executing on a base operating system) that allows for the creation of multiple software containers 1362A-R (representing separate user space instances and also called virtualization engines, virtual private servers, or jails) that may each be used to execute a set of one or more applications; with full virtualization, the virtualization layer 1354 represents a hypervisor (sometimes referred to as a virtual machine monitor (VMM)) or a hypervisor executing on top of a host operating system (OS), and the software containers 1362A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1350 (illustrated as instance 1376A) is executed within the software container 1362A on the virtualization layer 1354. In electronic devices where compute virtualization is not used, the instance 1376A on top of a host operating system is executed on the "bare metal" electronic device 1304. The instantiation of the instance 1376A, as well as the virtualization layer 1354 and software containers 1362A-R if implemented, are collectively referred to as software instance(s) 1352.

Alternative implementations of an electronic device may have numerous variations from that described above. For example, customized hardware and/or accelerators might also be used in an electronic device.

Figure 14:
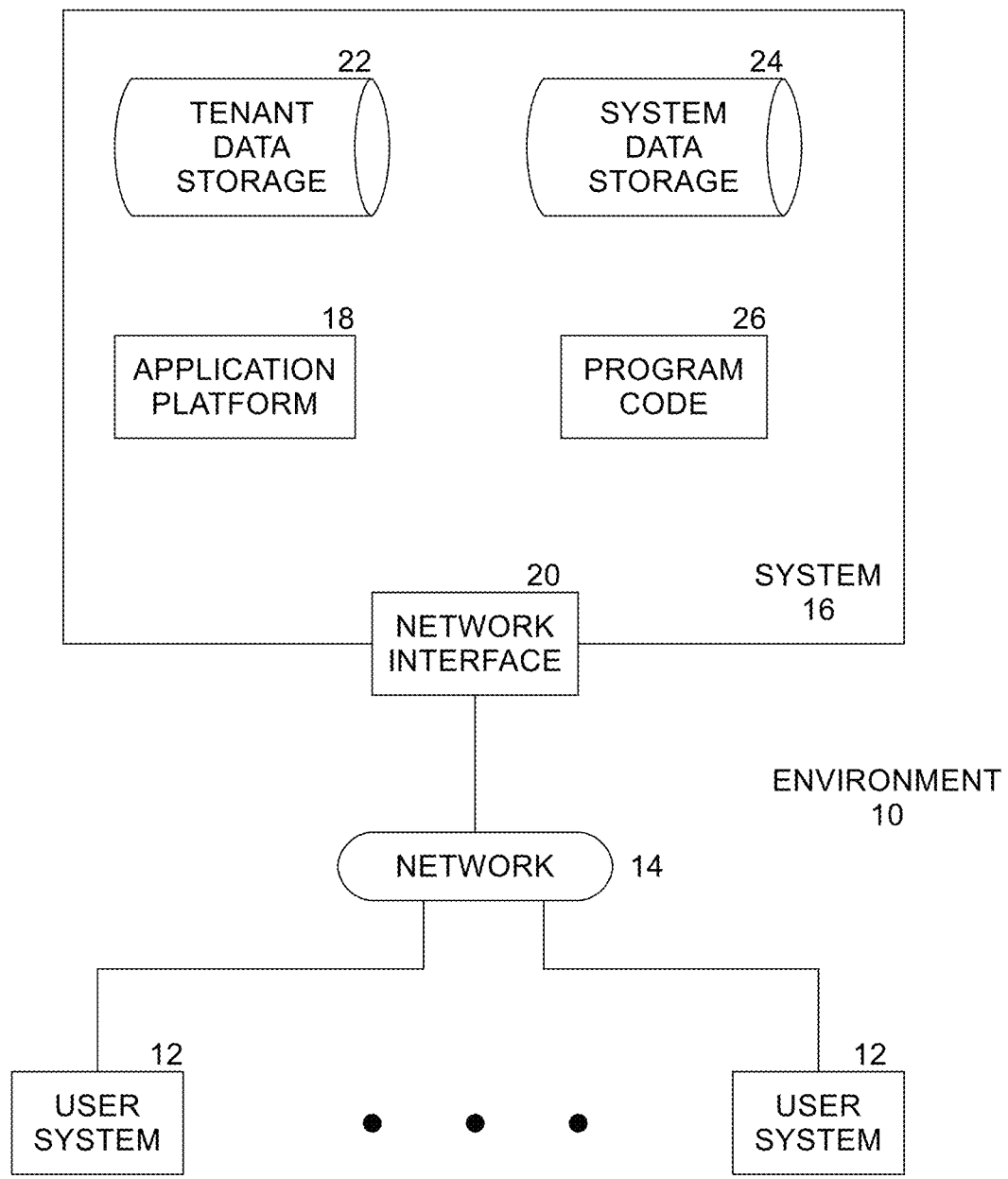
FIG. 14 shows a block diagram of an example of a computing environment in which the web page designer application including a timeline may be used in accordance with some implementations.

FIG. 14 shows a block diagram of an example of an environment 10 in which the present web page design and delivery operations may be used in accordance with some implementations. Computing environment 10 may include one or more user systems 12, network 14, and system 16, where system 16 includes application platform 18, network interface 20, tenant data storage 22, system data storage 24, and program code 26. In other implementations, environment 10 may not have all of these components and/or may have other components instead of, or in addition to, those listed above.

The system 16 includes hardware and software to implement application server 104, web page designer 102, and/or web server 116 and/or web page cache 118. User systems 12 are electronic devices used by one or more users (such as consumer devices 126) that subscribe to services (e.g., web page delivery) provided by the cloud computing services implemented by the system 16. User systems 12 might interact via a network 14 with the system 16. Further, in one implementation, the system 16 is a multi-tenant cloud computing architecture supporting multiple services, such as software as a service (SaaS) (e.g., customer relationship management (CRM) service provided by Salesforce.com, Inc.), platform as a service (PaaS) (e.g., execution runtime, database, application development tools; such as Force-.com®, Heroku™, and Database.com™ by Salesforce.com, Inc.), and/or infrastructure as a service (IaaS) (virtual machines, servers, storage). In some implementations, such a platform as a service allows for the creation, management and execution of one or more applications developed by the provider of the service, vendors accessing the service via user systems 12, or third-party application developers accessing the system 12. The system 16 may utilize methods for providing web page design and delivery, as described above. This allows for the system 16 to provide web page delivery in an efficient and scalable manner.

Network 14 is any network or combination of networks of devices that communicate with one another. For example, network 14 can be any one or any combination of a local area network (LAN), wide area network (WAN), telephone network, wireless network, point-to-point network, star network, token ring network, hub network, or other appropriate configuration. Network 14 can include a Transfer Control Protocol and Internet Protocol (TCP/IP) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

Each user system 12 is an end user electronic device, such as a desktop personal computer, workstation, laptop, personal digital assistant (PDA), tablet computer, cell phone, etc. Each user system 12 typically includes one or more user interface devices, such as a keyboard, a mouse, trackball, touch pad, touch screen, pen or the like, for interacting with a graphical user interface (GUI) provided on a display (e.g., a monitor screen, liquid crystal display (LCD), etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. User systems 12 might communicate with system 16 using TCP/IP and, at a higher network level, use other common Internet protocols to communicate, such as hypertext transport protocol (HTTP), file transfer protocol (FTP), Andrew file system (AFS), wireless application protocol (WAP), etc. In an example where HTTP is used, user system 12 might include an HTTP client commonly referred to as a "browser" for sending and receiving HTTP signals to and from a server at system 16 allowing a user of user system 12 to access, process and view information, pages and applications available to it from system 16 over network 14. Such a server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. However, other alternative configurations may be used instead.

In one implementation, tenant data storage 22 is a multi-tenant database management system (DBMS). In a typical multi-tenant DBMS, a single instance of software may be used to store data from multiple vendors (also known as tenants) and each vendor is provided with a dedicated share of the software instance. The term "data record" generally refers to a data entity created by or on behalf of a vendor. A data record is comprised of a set of fields defined within a database. A database can be viewed as a collection of database objects, such as a set of logical tables, containing data fitted into predefined categories. A "table" is one representation of a database object, and may be used herein to simplify the conceptual description of database objects. In the context of a relational database, each relational database table generally contains one or more data categories logically arranged as columns according to a schema, where the columns of the relational database table are different ones of the fields from the plurality of data records, and where each row of the relational database table are different ones of a plurality data records and contains an instance of data for each category defined by the fields. In some implementations of a cloud database (a database that runs on a cloud platform and access to which is provided as a database service), each database object contains a plurality of data records having fields, where identifiers are used instead of database keys, and wherein relationships are used instead of foreign keys. Regardless, by way of example, a data record can be for a business partner or potential business partner of a vendor, and can include information describing an entire company, subsidiaries, and/or contacts at the company. As another example, a data record can be for a project that a vendor is working on, such as an opportunity (e.g., a possible sale) with an existing partner, or a project that the vendor is trying to get. As another example, a customer-relationship management (CRM) database may include: 1) a database object that describes a customer with fields for basic contact information such as name, address, phone number, fax number, etc.; and 2) another database object might describe a purchase order, including fields for information such as customer, product, sale price, date, etc.

In some implementations, the tenant data storage 22 includes one or more databases storing the vendor/tenant data (such as information about the vendor's customers/users, information about the vendor's products/services, marketing materials. Thus, in operation, a vendor, through a user system 12, causes the vendor/tenant data to be stored in the tenant data storage 22. In some implementations, a vendor can access system 16 through user system 12 to access its data stored in tenant data storage 22.

In some implementations, system data storage 24 stores system data 25 accessible to system 16 and possibly multiple tenants, while program code 26 (e.g., a runtime engine that materializes application data from metadata; that is, there is a clear separation of the compiled runtime engine (also known as the system kernel), tenant data, and the metadata that describes each application, which make it possible to independently update the system kernel and tenant-specific applications and schemas, with virtually no risk of one affecting the others) for implementing various functions of system 16. In such implementations, the tenant data storage 22, which is a multi-tenant database management system (DBMS), manages one or more databases storing the vendor/tenant data and vendor/tenant application metadata. The tenant data and the system data may be stored in various databases, such as one or more Oracle® databases.

In one implementation, application platform 18 includes an application setup mechanism that supports application developers' creation and management of applications (such as web page designer 102), which may be saved as metadata into tenant data storage by save routines. Invocations to such applications may be coded using procedural language for structured query language (PL/SQL) that provides a programming language style interface. Invocations to applications may be detected by one or more system processes, which manage retrieving application metadata for the subscriber making the invocation and executing the metadata as an application in a virtual machine.

In certain implementations, one or more servers of system 16 is configured to handle requests for any user associated with any organization that is a tenant. Because it is desirable to be able to add and remove servers from the server pool at any time for any reason, there is preferably no server affinity for a user and/or organization to a specific server. In one implementation, therefore, an interface system implementing a load balancing function is communicably coupled between the servers of system 16 and the user systems 12 to distribute requests to the servers. In one implementation, the load balancer uses a least connections algorithm to route user requests to the servers. Other examples of load balancing algorithms, such as round robin and observed response time, also can be used. For example, in certain implementations, three consecutive requests from the same user could hit three different servers, and three requests from different users could hit the same server. In this manner, by way of example, system 16 is multi-tenant, wherein system 16 handles storage of, and access to, different database objects, data and applications across disparate users and organizations.

In certain implementations, user systems 12 (which may be client systems) communicate with the servers of system 16 to request and update system-level and tenant-level data from system 16 that may involve sending one or more queries to tenant data storage 22 and/or system data storage 24. In one implementation of system 16, a server in system 16 automatically generates one or more SQL statements (e.g., one or more SQL queries) that are designed to access the desired information. System data storage 24 may generate query plans to access the requested data from the database.

In some multi-tenant database systems, tenants may be allowed to create and store custom objects, or they may be allowed to customize standard entities or objects, for example by creating custom fields for standard objects, including custom index fields. In certain implementations, for example, all data records of a custom data object are stored in a single multi-tenant physical table, which may contain multiple logical database objects per organization. It is transparent to customers of the system 16 that their multiple database objects are in fact stored in one large table or that their data may be stored in the same table as the data of other customers.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue implementation.

References in the specification to "one implementation," "an implementation," "an example implementation," "some implementations," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A computing device comprising:
one or more processors; and
a non-transitory machine-readable storage medium having instructions stored therein, which when executed by the one or more processors, causes the computing device to:
accept first user input data to select a customer segment and a first point in time;
display a representation of components of a web page visible over a time frame of a time line according to visibility rules, the selected customer segment, and the first point in time, the time frame including the first point in time;
accept second user input data to select a second point in time; and
display the representation of components of the web page visible over the time frame according to the visibility rules, the selected customer segment, and the second point in time, the time frame including the second point in time.

2. The computing device of claim 1, comprising accepting the first point in time and the second point in time using a time slider user interface control.

3. The computing device of claim 1, comprising accepting the first point in time and the second point in time by accepting a selected change event indicator.

4. The computing device of claim 3, wherein change event indicators identify starting and ending times for when a component of the web page is visible.

5. The computing device of claim 1, comprising accepting the first point in time and the second point in time by accepting a selected schedule bar, the selected schedule bar identifying a component of the web page.

6. The computing device of claim 1, comprising rendering the web page according to the visibility rules, the selected customer segment, and one of the first and second points in time to determine which components of the web page are to be represented on the display.

7. The computing device of claim 1, wherein visibility rules comprise conditions to determine when components of the web page are visible for the selected customer segment and point in time.

8. The computing device of claim 1, comprising subdividing the time frame into sub-time frames and indicating a change in appearance of at least one of the sub-time frames illustrating a visibility problem of the components of the web page.

9. The computing device of claim 8, wherein the visibility problem comprises a time slice gap describing periods of time for which no component is visible for a portion of the web page.

10. The computing device of claim 8, wherein the visibility problem comprises a time slice contradiction describing periods of time when a component is never visible.

11. A method comprising:
accepting first user input data to select a customer segment and a first point in time;
displaying a representation of components of a web page visible over a time frame of a time line according to visibility rules, the selected customer segment, and the first point in time, the time frame including the first point in time;
accepting second user input data to select a second point in time; and
displaying the representation of components of the web page visible over the time frame according to the visibility rules, the selected customer segment, and the second point in time, the time frame including the second point in time.

12. The method of claim 11, comprising accepting the first point in time and the second point in time using a time slider user interface control.

13. The method of claim 11, comprising accepting the first point in time and the second point in time by accepting a selected change event indicator.

14. The method of claim 13, wherein change event indicators identify starting and ending times for when a component of the web page is visible.

15. The method of claim 11, comprising accepting the first point in time and the second point in time by accepting a selected schedule bar, the selected schedule bar identifying a component of the web page.

16. The method of claim 11, comprising rendering the web page according to the visibility rules, the selected customer segment, and one of the first and second points in time to determine which components of the web page are to be represented on the display.

17. The method of claim 11, wherein visibility rules comprise conditions to determine when components of the web page are visible for the selected customer segment and point in time.

18. The method of claim 11, comprising subdividing the time frame into sub-time frames and indicating a change in appearance of at least one of the sub-time frames illustrating a visibility problem of the components of the web page.

19. The method of claim 18, wherein the visibility problem comprises a time slice gap describing periods of time for which no component is visible for a portion of the web page.

20. The method of claim 18, wherein the visibility problem comprises a time slice contradiction describing periods of time when a component is never visible.

21. A non-transitory machine-readable storage medium having instructions stored therein, which when executed by one or more processors of a computing device, causes the computing device to:
accept first user input data to select a customer segment and a first point in time;
display a representation of components of a web page visible over a time frame of a time line according to visibility rules, the selected customer segment, and the first point in time, the time frame including the first point in time;
accept second user input data to select a second point in time; and
display the representation of components of the web page visible over the time frame according to the visibility rules, the selected customer segment, and the second point in time, the time frame including the second point in time.

22. The non-transitory machine-readable storage medium of claim 21, comprising instructions to accept the first point in time and the second point in time using a time slider user interface control.

23. The non-transitory machine-readable storage medium of claim 21, comprising instructions to accept the first point in time and the second point in time by accepting a selected change event indicator.

24. The non-transitory machine-readable storage medium of claim 23, wherein change event indicators identify starting and ending times for when a component of the web page is visible.

25. The non-transitory machine-readable storage medium of claim 21, comprising instructions to accept the first point in time and the second point in time by accepting a selected schedule bar, the selected schedule bar identifying a component of the web page.

* * * * *